Culp & Keeney,

Pitman Coupling.

No 2,602. Reissued May 14, 1867.

Witnesses,
Andrew Whiteley
Philip C. Diderich.

Inventors
G. W. D. Culp
W. J. Keeney
By their atty
R. D. C. Smith

AM. PHOTO-LITHO. CO. N.Y. (OSBORNE'S PROCESS)

United States Patent Office.

GEORGE W. D. CULP, OF ALLENSVILLE, AND WILLIAM J. KEENEY, OF FLORENCE, INDIANA.

*Letters Patent No.* 39,633, *dated August* 25, 1863; *reissue No.* 2,602, *dated May* 14, 1867.

DIVISION A.

IMPROVEMENT IN HARVESTER CUTTER-BAR CONNECTION.

The Schedule referred to in these Letters Patent and making part of the same.

TO ALL WHOM IT MAY CONCERN:

Be it known that we, G W. D. CULP, of Allensville, and W. J. KEENEY, of Florence, in the county of Switzerland, and State of Indiana, have invented a new and useful Improvement in Mounting and Communicating Motion to the Cutting Apparatus of Harvesting Machines; and we do hereby declare the following to be a full, clear, and exact description of the same, reference being had to the accompanying drawings, in which—

Figure 4:
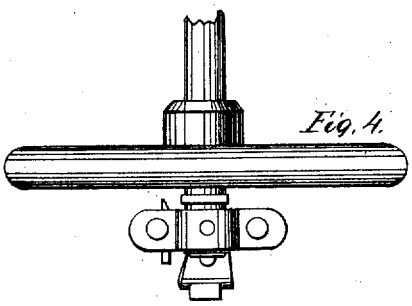
Figure 4 is an end elevation of the crank-wrist end of the pitman.
Figure 3:
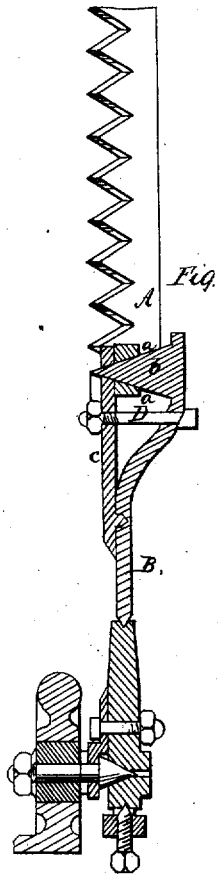
Figure 3 is a horizontal longitudinal section of the same.
Figure 2:
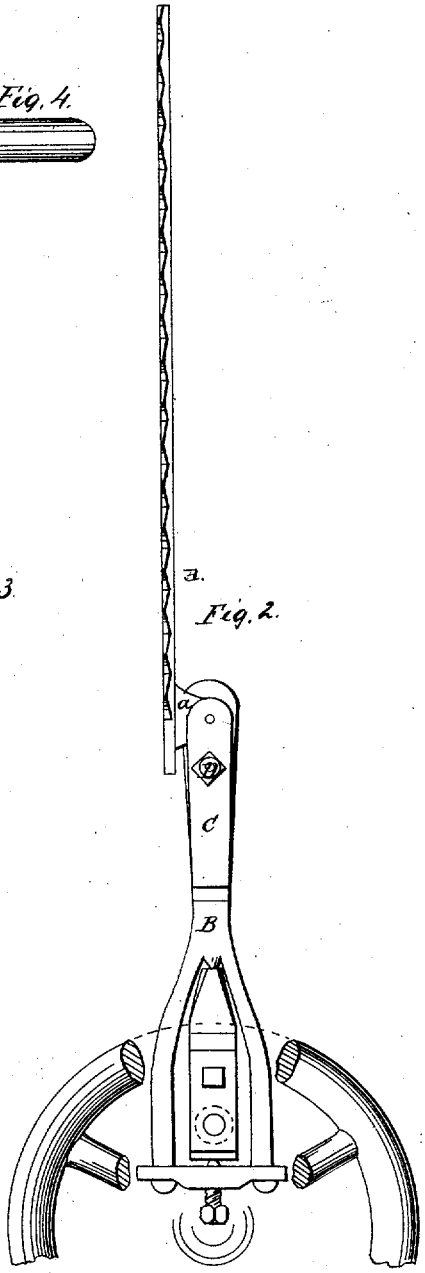
Figure 2 is a side elevation of the same.
Figure 1:
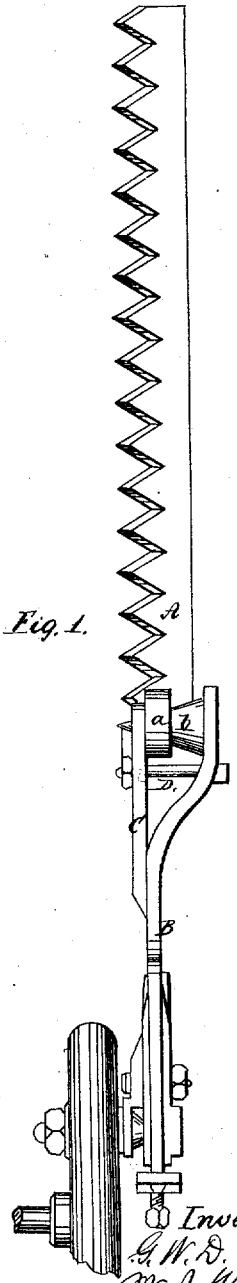
Figure 1 is a plan view of our invention.

The object of that part of our invention embraced in this patent is to provide a strong, durable, and cheap arrangement to take up the slack motion in pitman-connections to the cutter-bars of harvesters, and also to prevent injury to the working part of the machine by the slight twisting or rolling motion of the pitman incident to those parts while the machine is passing over rough or uneven ground; and it consists in a joint at the heel of the cutter-bar, first, formed by passing a conical or conoidal point projecting from the pitman through a correspondingly shaped orifice in said heel; second, secured by a friction-plate secured to the pitman and passing on the opposite side of the heel and covering the said conical point; third, and securing constant contact and correct position of the parts by a binding screw, which forces the conical or conoidal point through the orifice above alluded to.

That others may understand the construction and operation of this part of our invention, we will describe it.

A may represent a cutter-bar of any suitable form, constructed with a lug, *a*, projecting upward, and perforated to form a socket for the attachment of a pitman, B. The said pitman is provided at its outer end with a conical or conoidal projection, *b*, which, fitting in the socket in *a*, constitutes the journal by which the pitman is connected to the cutter-bar. The conical or conoidal projection *b* is inserted from one side only, and the socket in the lug *a* penetrates entirely through said lug, so that the joint of the projection *b* may extend also entirely through said lug and project beyond the opposite side thereof. By this means, as the socket and journal become worn, and the connection thereby loosened, it may be rendered tight and snug again by inserting said journal *b* further through its socket. In order that this joint may be complete within itself, and the conical or conoidal journal *b* secured always within its socket without the use of stationary guides or friction-plates, we provide a friction-plate, C, attached to the side of the pitman, and bearing against the side of the lug *a* opposite to the pitman B, so that, when the conical or conoidal journal *b* is in its socket, the said lug will be confined between the pitman and said friction-plate. An orifice is made through the friction-plate opposite to the point of the journal *b*, so that, as the latter projects more and more through the lug *a*, it may project into or through the friction-plate also. With a joint of this character it is necessary that there should be an adjustment which will enable the attendent to tighten up the parts and render the joint snug, or, in other words, to take up the slack or lost motion. We prefer to accomplish this adjustment by means of a take-up bolt, D, having a head on one end and a screw at the other, so that, whenever necessary, the friction-plate C and pitman B may be brought nearer together, and the journal *b* thereby pressed into its socket sufficiently to make the joint snug.

Having described our invention, what we claim as new, and desire to secure by Letters Patent, is—

1. Connecting the pitman B to the cutter-bar A of a harvesting machine by means of a single conical or conoidal journal, *b*, passing into a correspondingly shaped socket in the lug *a*, and secured therein by a friction-plate, C, substantially as and for the purpose set forth.

2. The set-screw D, in combination with the friction-plate C, conical or conoidal journal *b*, and lug *a*, substantially as and for the purpose set forth.

GEO. W. D. CULP,
WM. J. KEENEY.

Witnesses:
WM. LAND,
GEO. W. KNAPP,
JOHN W. REXFORD.